(12) United States Patent
Agostini et al.

(10) Patent No.: US 7,398,237 B2
(45) Date of Patent: Jul. 8, 2008

(54) RULE BASED ENGINE FOR VALIDATING FINANCIAL TRANSACTIONS

(75) Inventors: Lucio Agostini, Toronto (CA); Sumit Taneja, Thornhill (CA); Yining Chen, Toronto (CA); J. Paul Morrison, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/178,439

(22) Filed: Jun. 24, 2002

(65) Prior Publication Data

US 2003/0084428 A1 May 1, 2003

(30) Foreign Application Priority Data

Jun. 26, 2001 (CA) .................................. 2351990

(51) Int. Cl.
  *G06Q 10/00* (2006.01)
  *G06Q 40/00* (2006.01)
  *G06F 15/173* (2006.01)
(52) U.S. Cl. ........................ 705/35; 705/1; 705/36 R; 705/37; 709/244
(58) Field of Classification Search ......... 717/106–109, 717/114–115; 706/47–48; 705/1, 10, 35–45; 709/224
See application file for complete search history.

(56) References Cited

U.S. PATENT DOCUMENTS

| 5,495,603 | A | | 2/1996 | Fruchtman et al. | 395/600 |
|---|---|---|---|---|---|
| 5,706,494 | A | | 1/1998 | Cochrane et al. | 395/602 |
| 5,715,373 | A | * | 2/1998 | Desgrousilliers et al. | 706/47 |
| 5,889,932 | A | | 3/1999 | Adegeest et al. | 395/117 |
| 6,105,149 | A | | 8/2000 | Bonissone et al. | 714/26 |
| 6,119,231 | A | | 9/2000 | Foss et al. | 713/200 |
| 6,151,584 | A | | 11/2000 | Papierniak et al. | 705/10 |
| 6,151,608 | A | | 11/2000 | Abrams | 707/204 |
| 6,263,127 | B1 | | 7/2001 | Dragone et al. | 385/24 |
| 6,601,019 | B1 | * | 7/2003 | Liles et al. | 702/186 |
| 6,631,411 | B1 | * | 10/2003 | Welter et al. | 709/224 |

(Continued)

OTHER PUBLICATIONS

Patterson, Hannesy "Computer Architecture A Quantitative Approach" 1996 Morgan Kaugmann Publishers, Inc. pp. 335-348.*

(Continued)

*Primary Examiner*—Lewis A. Bullock, Jr.
*Assistant Examiner*—Jason Mitchell
(74) *Attorney, Agent, or Firm*—Schmeiser, Olsen & Watts; William H. Steinberg

(57) ABSTRACT

A method and system for checking whether customer orders for transactions of financial instruments conform to business logic rules. Executable rule files are created and stored in a repository. New executable rule files can be created by scripting the new business logic rules in a script file which is converted into a corresponding source code file written in a computer programming language. The source code file is compiled to create an individual executable rule file. A rule selection repository contains identification of groups of selected executable rule files. The invention determines the category of the customer order and reads, from the rule selection repository, a group of executable rule files that correspond to the identified category of the customer order. The selected executable rule files are executed to check the conformance of the customer order. Execution results are stored in a status repository for subsequent retrieval and analysis.

1 Claim, 17 Drawing Sheets

U.S. PATENT DOCUMENTS 6,792,562 B1 * 9/2004 Korhonen .................... 714/39
6,820,069 B1 * 11/2004 Kogan et al. .................. 706/46
6,865,566 B2 * 3/2005 Serrano-Morales et al. ... 706/47

OTHER PUBLICATIONS

M. Fan, J. Stallaert "A Web-Based Financial Trading System" Apr. 1999, IEEE, pp. 64-70.*

R. Chandra; A Segev "Managing Temporal Financial Data in an Extensible Database", 1993 Proceedings of the 19th International Conference on Very Large Data Bases, pp. 203-313.*

IBM Technical Disclosure Bulletin, "Dynamically Configurable User Interface for the Manipulation of Data Objects", Mar. 1994, pp. 23-30.

IBM Technical Disclosure Bulletin, "System Supplied Data Integrity", Dec. 1982, pp. 3718-3721.

* cited by examiner

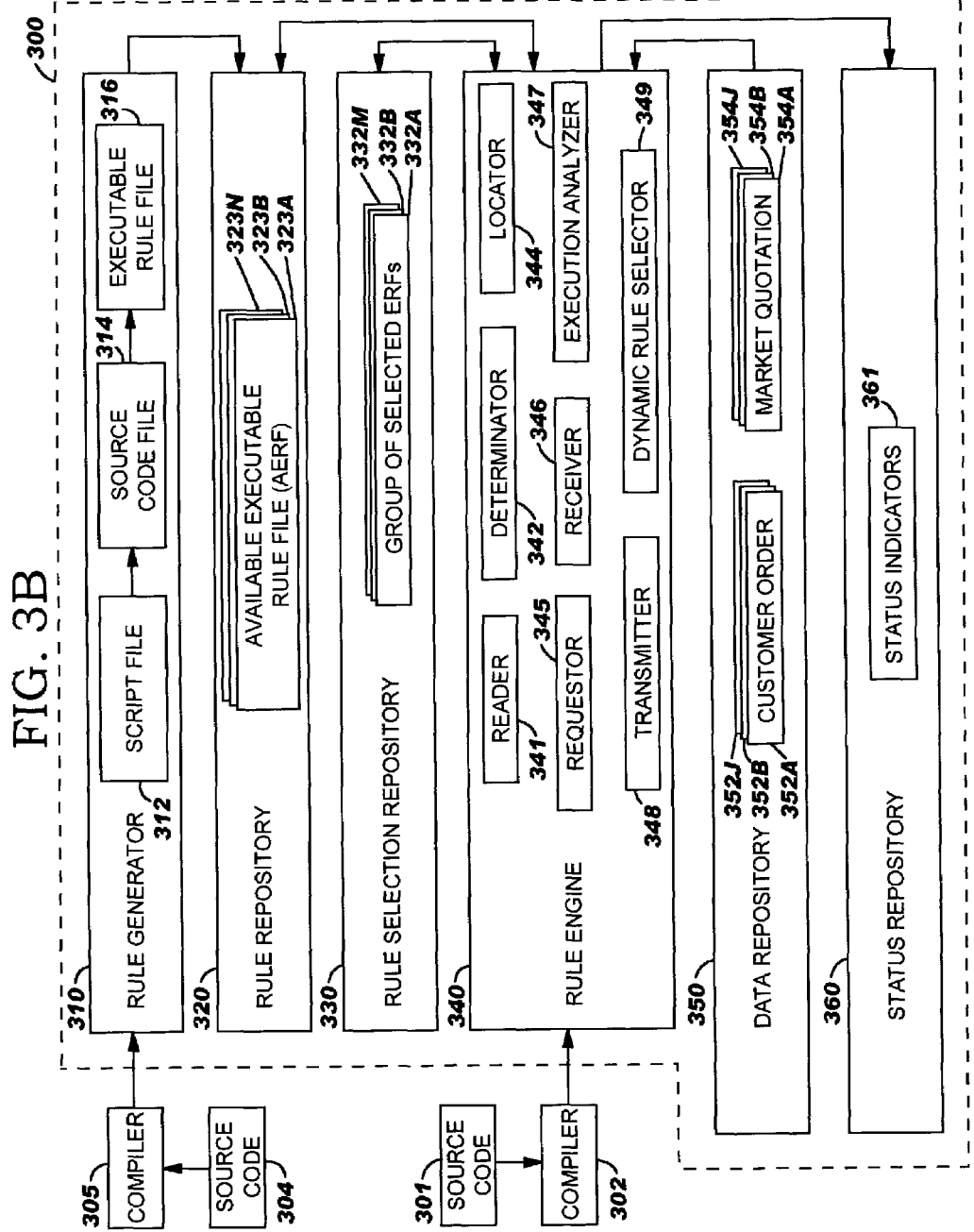

FIG. 5A

///////CODE FOR DATA TAG WITH CLASSNAME: OrdersVDO

// do TDM get for OrdersVDO and retrieve data from it

// get entity from TDM
OrdersVDO ordersvdo1=(OrdersVDO)_tdm.get("com.ibm.eb2engine.rm.OrdersVDO",null,null,fales);
if(ordersvdo1==null)
{
  // null is not an acceptable value. Populate rule data, add a score card item, and throw and exception
  _ruleData[0]=new RuleData("com.ibm.eb2engine.rm.OrdersVDO","null");
  _sciMsgParams=new Object[2];
  _sciMsgParams[0]=m_ruleName;
  _sciMsgParams[1]="_ordersvdo1";
  sc.add(new ScoreCardItem(m_ruleName,RBEConstantList.R_ABNORMAL,"EB272120",_sciMsgParams,_ruleData));
  throw (new AbsentDataException(m_ruleName+":"+com.ibm.eb2engine.rm.OrdersVDO null"));
}

// retrieve data using the getter method
String fiType= ordersvdo1.getBdtFiType();
if (fiType==null)
{
  //Populate rule data array, add an Abnormal score card item, and throw an Exception
  _ruleData[0]=newRuleData("OrdersVDO.getBdtFiType()","null");
  _sciMsgParams=newObject[2];
  _sciMsgParams[0]=m_ruleName;
  _sciMsgParams[1]="fiType";
  sc.add(new ScoreCardItem(m_ruleName,RBEConstantList.R_ABNORMAL,"EB272120",sciMsgParams,_ruleData));
  throw (new AbsentDataException(m_ruleName+":"+fiType null"));
}

// store the result of the getter/TDM access (if no getter was specified) in the ruleData array
_ruleData[0]=new RuleData("OrdersVDO.getBdtFiType()",fiType);

FIG. 5B

```
////// CODE FOR CONST TAG WITH KEY: INSTRUMENT_CODE_EQUITY

// retrieve INSTRUMENT_CODE_EQUITY from the BCM
String k_eq=(String)_bcm.get(null,"INSTRUMENT_CODE_EQUITY");

// if BCM returned null, populate rule data, and add an abnormal scorecard item, and throw an exception
if (k_eq==null)
{
    _ruleData[1]=new RuleData("INSTRUMENT_CODE_EQUITY","null");
    sciMsgParams=new Object[2];
    sciMsgParams[0]=m_ruleName;
    sciMsgParams[1]="k_eq";
    sc.add(new ScoreCardItem(m_ruleName,RBEConstantList.R_ABNORMAL,"EB272119",_sciMsgParams,_ruleData));
    throw (new AbsentBusinessConstantException(m_ruleName+":INSTRUMENT_CODE_EQUITY constant null"));
}

// add this const value to the rule data array
_ruleData[1]=new RuleData("INSTRUMENT_CODE_EQUITY",k_eq);
```
— 502

```
////// SCRIPT if (k_eq.equals(fiType)) {

// tell the scorecard that there is a redirect request
    _sc.setRedirect(true);
    return ;
```
— 504

FIG. 6A

```xml
<?xml version="1.0"?>
<!DOCTYPE LAYERGROUPMGR SYSTEM "layergroupmgr.dtd">
<LAYERGROUPMGR>
    <LAYERGROUP ENTITYNAME="com.ibm.eb2engine.requests.inbeans.ClOptionOrder">
        <LAYER NAME = "cloplayer1">
            <RULE NAME ="OpOrderValidateAction"/>
            <RULE NAME ="OpOrderValidateStrikeMonth"/>
            <RULE NAME ="OpOrderValidateStrikeYear"/>
            <RULE NAME ="OpOrderValidateStrikePrice"/>
            <RULE NAME ="OpOrderValidateOptionType"/>
            <RULE NAME ="OpOrderValidateOrderStatus"/>
            <RULE NAME ="OpOrderValidateSettleInstrCode"/>
            <RULE NAME ="OpOrderValidateOrderSymbol"/>
        </LAYER>
        <LAYER NAME = "cloplayer2">
            <RULE NAME ="OpOrderValidateExpiryType"/>
            <RULE NAME ="OpOrderValidateExpiryDate"/>
            <RULE NAME ="OpOrderValidateAONInd"/>
            <RULE NAME ="OpOrderValidateOrderType"/>
            <RULE NAME ="OpOrderValidatePrice"/>
            <RULE NAME ="OpOrderValidateQuantity"/>
            <RULE NAME ="OpOrderValidateOpenCloseCode"/>
            <RULE NAME ="OpOrderValidateAccountTelNo"/>
        </LAYER>
        <LAYER NAME="clopcxr">
            <RULE NAME ="IsOldClOptionOrder"/>
            <RULE NAME ="OpCheckAcctIDCXR"/>
            <RULE NAME ="OpCheckActionCXR"/>
            <RULE NAME ="OpCheckOrderSymbolCXR"/>
            <RULE NAME ="OpCheckUnderlyingSymbolCXR"/>
            <RULE NAME ="OpCheckStrikeMonthCXR"/>
            <RULE NAME ="OpCheckStrikeYearCXR"/>
            <RULE NAME ="OpCheckStrikePriceCXR"/>
            <RULE NAME ="OpCheckOptionTypeCXR"/>
            <RULE NAME ="OpCheckQuantityCXR"/>
        </LAYER>
    </LAYERGROUP>
</LAYERGROUPMGR>
```

FIG. 10

```xml
<?xml version="1.0"?>
<!DOCTYPE LAYERGROUPMGR SYSTEM "layergroupmgr.dtd">
<LAYERGROUPMGR>
  <LAYERGROUP ENTITYNAME="com.ibm.eb2engine.requests.inbeans.ParamterLst">
    <LAYER NAME ="paramlstlayer1" CLASS="com.ibm.rbe.impl.DunamicLayer" SEQUENCER="ParamRuleSequencer">
      <RULE NAME="ParamValAccountValuationType" KEY="AccountValuationType"/>
      <RULE NAME="ParamValCaseSensitivity" KEY="CaseSensitivity"/>
      <RULE NAME="ParamValFirmId" KEY="FirmID"/>
      <RULE NAME="ParamValFundTransferDaysForward" KEY="FundTransferDaysForward"/>
      <RULE NAME="ParamValNewsService" KEY="NewsService"/>
      <RULE NAME="ParamValWipOrderLife" KEY="WipOrderLife"/>
      <RULE NAME="ParamValMaxPwdKeybConsChars" KEY="MaxPwdKeybConsChars"/>
      <RULE NAME="ParamValAccountRangeHigh" KEY="AccountRangeHigh"/>
      <RULE NAME="ParamValAccountRangeLow" KEY="AccountRangeLow"/>
      <RULE NAME="ParamValSupportPhoneNumber" KEY="SupportPhoneNumber"/>
      <RULE NAME="ParamValFundTransferDaysBack" KEY="FundTransferDaysBack"/>
      <RULE NAME="ParamValOrderListDays" KEY="OrderListDays"/>
      <RULE NAME="ParamValTransactionHistoryDays" KEY="TransactionHistoryDays"/>
      <RULE NAME="ParamValWatchListMaximumLists" KEY="WatchListMaximumLists"/>
      <RULE NAME="ParamValWatchListMaximumSymbols" KEY="WatchListMaximumSymbols"/>
      <RULE NAME="ParamValWatchListTotal" KEY="WatchListTotal"/>
      <RULE NAME="ParamValPasswordInvalidLimit" KEY="PasswordInvalidLimit"/>
      <RULE NAME="ParamValUserIdMinimumLength" KEY="UserIdMinimumLength"/>
      <RULE NAME="ParamValUserIdMaximumLength" KEY="UserIdMaximumLength"/>
      <RULE NAME="ParamValSessionReplayResultMaximum" KEY="SessionReplayResultMaximum"/>
      <RULE NAME="ParamValSessionReplayDays" KEY="SessionReplayDays"/>
      <RULE NAME="ParamValSymbolSearchResultsMaximum" KEY="SymbolSearchResultsMaximum"/>
      <RULE NAME="ParamValMarketCloseCheck" KEY="MarketCloseCheck"/>
      <RULE NAME="ParamValOEConfirmationTime" KEY="OEConfirmationTime"/>
      <RULE NAME="ParamValOEGTDDefaultPeriod" KEY="OEGTDDefaultPeriod"/>
      <RULE NAME="ParamValTermCondTimestamp" KEY="TermCondTimestamp"/>
      <RULE NAME="ParamValUserSearchNumber" KEY="UserSearchNumber"/>
```

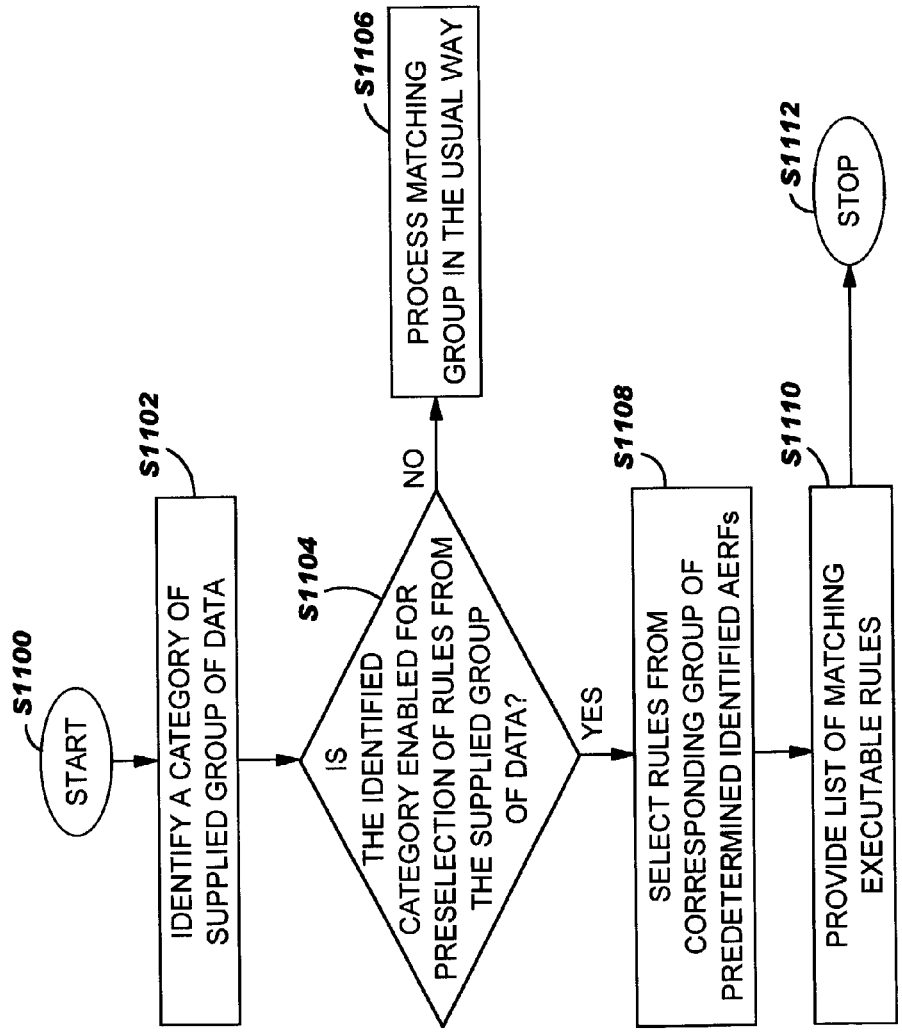

RULE BASED ENGINE FOR VALIDATING FINANCIAL TRANSACTIONS

FIELD OF THE INVENTION

The present invention relates to a system and method for checking conformance of input data prior to subsequent processing, and more specifically to a system and a method for checking whether financial transactions conform to corresponding sets of selected executable rule files containing business logic rules.

BACKGROUND OF THE INVENTION

The brokerage industry can be highly competitive. Strategically, brokerage firms often attempt to gain a larger market share of customers by offering lower transactions fees. It is highly desirable for brokers to continually find ways to reduce their operating costs associated with fulfilling or transacting customer orders for financial instruments, such as stocks, bonds, options, and mutual funds, while maintaining or improving their ability to serve customers by reliably fulfilling customer orders on a timely basis.

Typically, brokerages accept or input customer orders via their systems and then forward the orders to an existing order fulfillment system or legacy system for subsequent transaction of the customer order. Typically, the order fulfillment system is a legacy system that has been reliably operating for many years, and legacy systems are rarely modified to perform significantly new functions to avoid potentially undesirable consequences to the overall system performance. However, when a customer order for a financial transaction has flaws, the existing order fulfillment system cannot fulfill the customer order and the subsequently unfulfilled customer order is returned by the existing order fulfillment system to the broker along with a financial charge for incurred processing time on the existing order fulfillment system. In such a situation, the customer order may not be fulfilled on a timely basis and undesirable costs may be incurred in the attempt to transact the customer order.

Typically, a programming application, written in a computer programming language, includes nested programming logic having if/then programming statements each implementing business logic rules for a specific broker. The programming application is subsequently compiled into an executable file which is then used by a central processing unit to check the conformance of customer orders. Typically, the implemented business logic rules are relevant for the business needs of a specific broker. Frequently, the programming application requires modifications to the implemented business logic rules, in which case, the entire program needs to be reviewed by an expert computer programmer and recompiled and re-tested to ensure suitable and reliable operation. However, the prior art applications are frequently difficult to maintain typically because expert computer programmers do not remain with the same employer, or documentation of the programming is severely lacking in depth. Therefore, new programmers face the task of learning a new programming language to remove, add, modify business logic rules and re-test the updated computer application. Additionally, the known prior art computer applications require that all of the rules need to be serially or sequentially applied in an inflexible manner to each customer order. This inflexibility leads to an accumulation of unnecessary processing time and effort on the behalf of a computer system because not all of the rules may be required to check whether data elements of each customer order conform to the business logic rules.

Another problem experienced with on-line transaction of customer orders is that even though the customer orders may appear to be acceptable to a existing order fulfillment system, the customer order may not be appropriate with respect to an investment profile or preferences of the customer. This can lead to brokers transacting inappropriate types of customer orders for some customers. Some jurisdictions require brokers to know the investment tolerances or profiles of their clients before transacting customer orders, which is known as 'know your customer' rules.

In conclusion, prior art systems codify the business logic rules into a single source code file and subsequently compile the source code file to create a single executable file. However, when the business logic rules require to be changed, a computer programmer is required to examine the original source code, ascertain the extent of the required changes, test, and debug the new code, followed by the required compilation to create an updated or revised executable file. Disadvantageously, this required the talents of an experienced programmer, and if that programmer were new to the organization, then more time would be required to understand the original source code especially if the original source code were not properly documented. Also, even an experienced programmer would not typically appreciate or understand the requirements of a business and the types of business logic rules that would be required to check conformance of customer orders. Disadvantageously, the business logic would change periodically to suit the needs of regulatory agencies or stock market conditions, which would place a undue burden on the programmer attempting to adapt the source code to newly developed business logic rules.

SUMMARY OF THE INVENTION

The present invention provides a system for checking whether input data, such as customer orders for transactions of financial instruments, conform to business logic rules. The system enables a non-programmer to include, remove, and/or reorder, in a simple text file, a set of individually identified executable rule files each encoding business logic rules, thereby significantly reducing the need to recompile the entire program application. Each executable rule file is individually created and stored in a repository of available executable rule files (AERFs). When an executable rule file becomes obsolete, a new executable rule file can be created by scripting the new business logic rules in a script file which in turn is converted into a corresponding source code file being written in a convenient computer programming language. Subsequently, the source code file is compiled to create an individual executable rule file, which is then placed into the rule repository. A rule selection repository, which can be implemented as a structured text file, is used for containing identification of groups of selected executable rule files. The system of the invention determines the category of the customer order and reads, from the rule selection repository, a group of selected executable rule files that correspond to the identified category of the customer order. The group of selected executable rule files are executed to check the conformance of the customer order. Execution results are stored in a status repository for subsequent retrieval and analysis.

According to a first aspect of the present invention, there is provided a method for testing at least one data item in a transaction order against at least one business logic rule, the method including the steps of creating a repository of executable rules, each executable rule adapted to encode a business logic rule, listing a subset of executable rules to be used in checking the transaction order, at least one listed executable rule being adapted to test the at least one data item against at least one business logic rule, locating the listed subset of executable rules in the repository, causing the at least one executable rule of the subset to test the at least one data item against the at least one business logic rule, and indicating whether the at least one data item conforms to the at least one business logic rule.

According to a second aspect of the present invention, there is provided a computer program product for use in a computer system operatively coupled to a computer readable memory, the computer program product including a computer-readable data storage medium tangibly embodying computer readable program code for directing the computer to for test at least one data item in a transaction order against at least one business logic rule, the code including code for instructing the computer system to create a repository of executable rules, each executable rule adapted to encode a business logic rule, code for instructing the computer system to list a subset of executable rules to be used in checking the transaction order, at least one listed executable rule being adapted to test the at least one data item against at least one business logic rule, code for instructing the computer system to locate the listed subset of executable rules in the repository, code for instructing the computer system to cause the at least one executable rule of the subset to test the at least one data item against the at least one business logic rule, and code for instructing the computer system to indicate whether the at least one data item conforms to the at least one business logic rule.

According to a third aspect of the present invention, there is provided a computer system having a computer readable memory, the system for testing at least one data item in a transaction order against at least one business logic rule, the system including executable code for placement in the memory, a repository of executable rules, each executable rule adapted to encode a business logic rule, a listing of a subset of executable rules to be used in checking the transaction order, at least one listed executable rule being adapted to test the at least one data item against at least one business logic rule, wherein the executable code includes: means for locating the listed subset of executable rules in the repository, means for causing the at least one executable rule of the subset to test the at least one data item against the at least one business logic rule, and means for indicating whether the at least one data item conforms to the at least one business logic rule.

A better understanding of these and other aspects of the invention can be obtained with reference to the following drawings and description of the preferred embodiments.

BRIEF DESCRIPTION OF THE DRAWINGS

Reference is made to the accompanying drawings which show, by way of example, embodiments of the present invention, and in which:

FIGS. 3A and 3B depict an embodiment and a preferred embodiment of the invention;

FIGS. 5A and 5B depict a source code file created by converting the script file of FIG. 4a;

FIGS. 6A and 6B depict a rule selection repository;

FIG. 11 depicts a flowchart of an operation for dynamically selecting rules.

DETAILED DESCRIPTION

Figure 1:
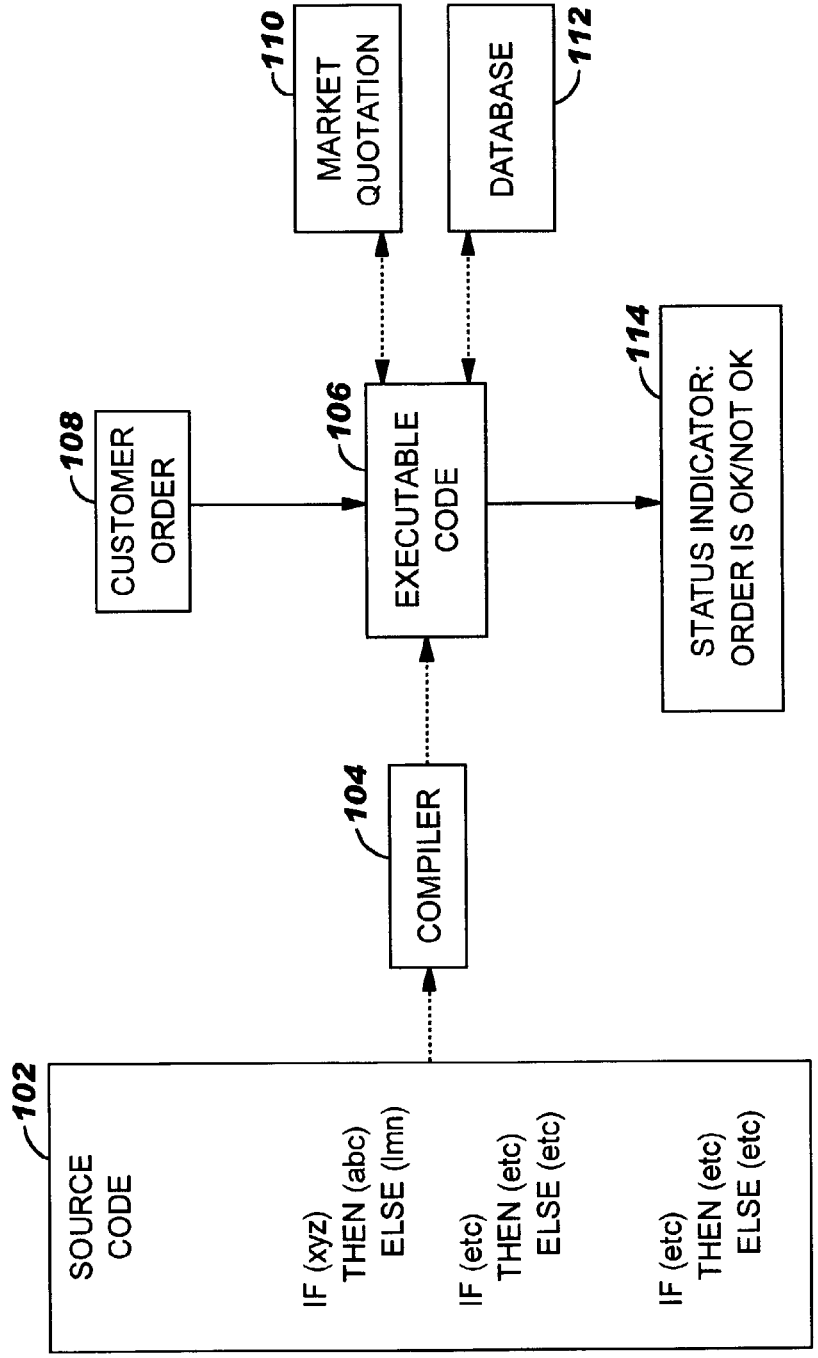
FIG. 1 depicts an example of the prior art.

Referring to FIG. 1, there is depicted a prior art method for checking whether data, such as customer order 108 for transacting financial instruments, conforms to various rules which are encoded in source code 102. The computer programmed instructions, hereinafter called 'instructions' of source code 102 include "if, then, else" style of instructions which are executed serially or can include branching statements for bypassing particular groups of instructions to suit a specific programming need. When the encoded rules must be changed, an experienced programmer modifies the instructions of source code 102 and uses compiler 104 to compile source code 102 to generate executable code 106 that replaces an older version of executable code. The newly generated executable code 106 is tested to ensure that the modified source code works properly and does not negatively impact the unmodified source code. Then, the tested source code can be used with the customer order 108.

Executable code 106 examines the customer order 108 and may use related information that is useful for checking the conformance of the customer order 108. The related information can be a market quotation 110 for a quote to transact financial instruments mentioned in customer order 108 or can be data from a database 112 containing customer specific information, such as account numbers and the like. After the executable code 106 examines customer order 108, a market quotation 110, and data from database 112, executable code 106 proceeds to check whether customer order 108 conforms to the encoded rules. Executable code 106 provides a status indicator 114 for indicating whether customer order 108 conforms to the encoded rules.

The main disadvantage of using the prior art is that when the rules need to be changed, an experienced computer programmer must update or modify source code 102. The frequency of changing the encoded rules occurs on a very frequent basis in which the source code 102 must be recompiled to generate new executable code 106.

Figure 2A:
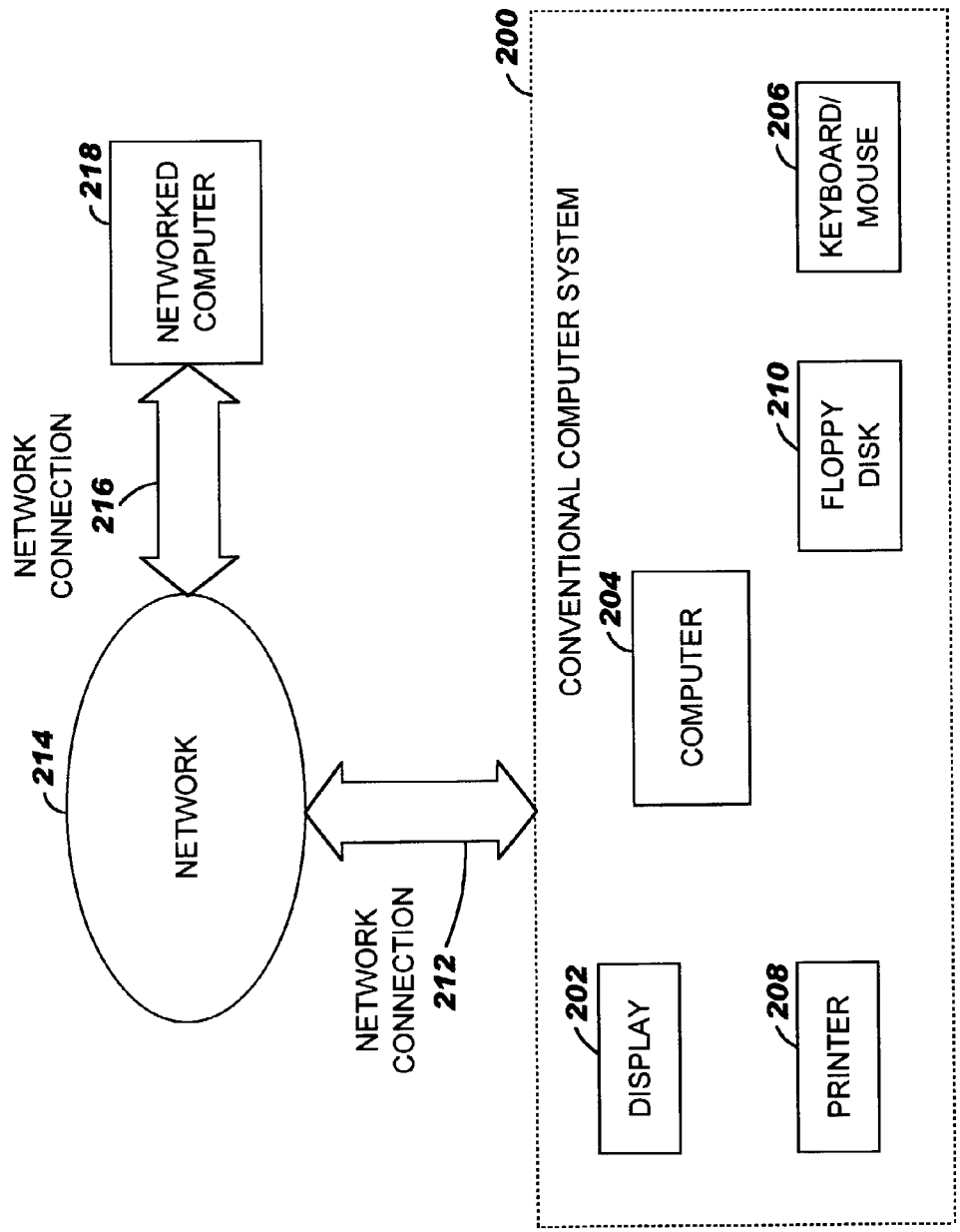
FIGS. 2A and 2B depict a computer system and subsystems of the computer system for operation with various embodiments of the invention.

Referring to FIG. 2A, there is depicted an embodiment of a computing platform in which various embodiments of the invention operate. The computing platform is a system that includes a conventional computer system 200 operationally coupled to a networked computer 218 via suitable network connections 212, 216 and network 214. Network 214 is a conventional network such as a local area network, wide area network, intranets, Internet, and the like, or a convenient combination thereof. Essentially, the network 214 provides a convenient mechanism for transporting data, such as customer orders for transacting a financial instrument, to the computer system 200. It will be appreciated that in another embodiment of computer system 200, computer 200 is not connected to the network 214 via network connection 212, provided the data or customer order is entered directly to the memory of computer system 200 via a keyboard/mouse 206 or via a removable computer readable medium, such as a floppy disk 210. For convenience, aspects of the present invention can be distributed amongst various networked computers interacting with a computer system 200 via network 214 or a combination of networks. Preferably, a majority of the invention will be implemented in computer system 200. Computer system 200 includes a computer 204 which communicates with various output devices such as a display terminal 202 or a printer 208, with the network 214, and with various input devices, such as keyboard/mouse 206, or floppy disk 210. Other devices can include various computer peripheral devices such as a scanner, CD-ROM drives, and the like.

Figure 2B:
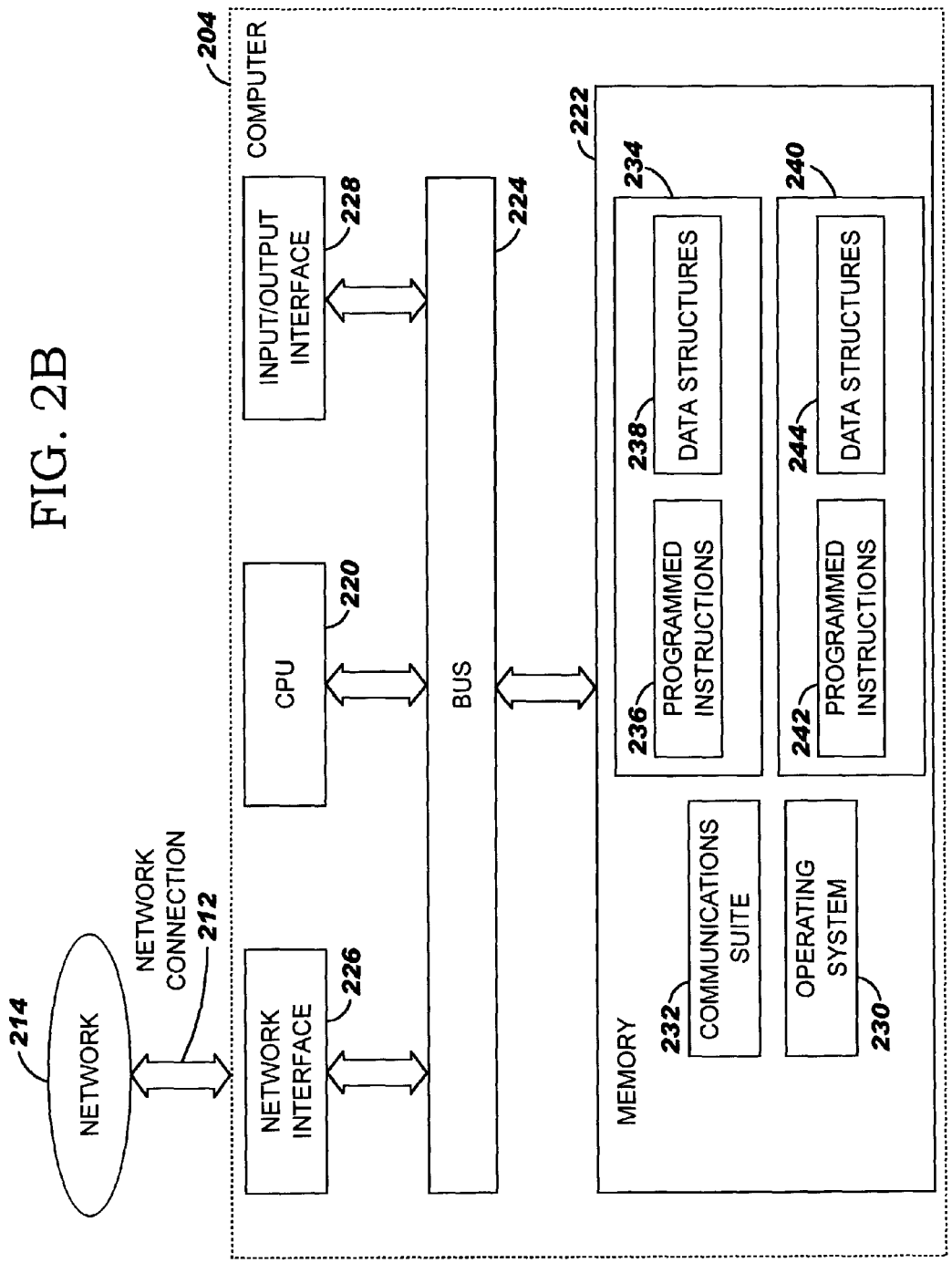

Referring to FIG. 2B, there is depicted an embodiment of computer 204 that includes a bus 224 that operationally interconnects various subsystems or components of the computer 204, such as a central processing unit (CPU) 220, a memory 222, a network interface 226, and an input/output interface 228.

CPU 220 is a commercially available CPU suitable for operations described herein. Other variations of CPU 220 can include a plurality of CPUs. Suitable support circuits or components can be included for adapting the CPU 220 for optimum performance with the subsystems of computer 204.

Input/output interface 228 enables communication between various subsystems of computer 204 and various I/O devices, such as keyboard/mouse 206. Input/output interface 228 includes a video card for operational interfacing with display terminal 202, and preferably a disk drive unit for reading suitable removable computer-readable medium, such as a floppy disk 210, or CD. The removable medium provides programming instructions for subsequent execution by CPU 220 to configure and enable computer 204 to achieve the functions of the invention, or can provide removable data storage if desired.

Network interface 226, in combination with a communications suite 232, enables suitable communication between computer 204 and other computers operationally connected via network 214. Examples of a conventional network interface can include an Ethernet card, a token ring card, a modem, or the like. Optionally, network interface 226 may also enable retrieval of transmitted programming instructions or data to configure and enable computer 204 to achieve the functions of the invention. Optionally, aspects of the invention can be enabled in various computer systems operationally networked to form a distributed computing environment to achieve the functions of the invention.

Figure 3A:
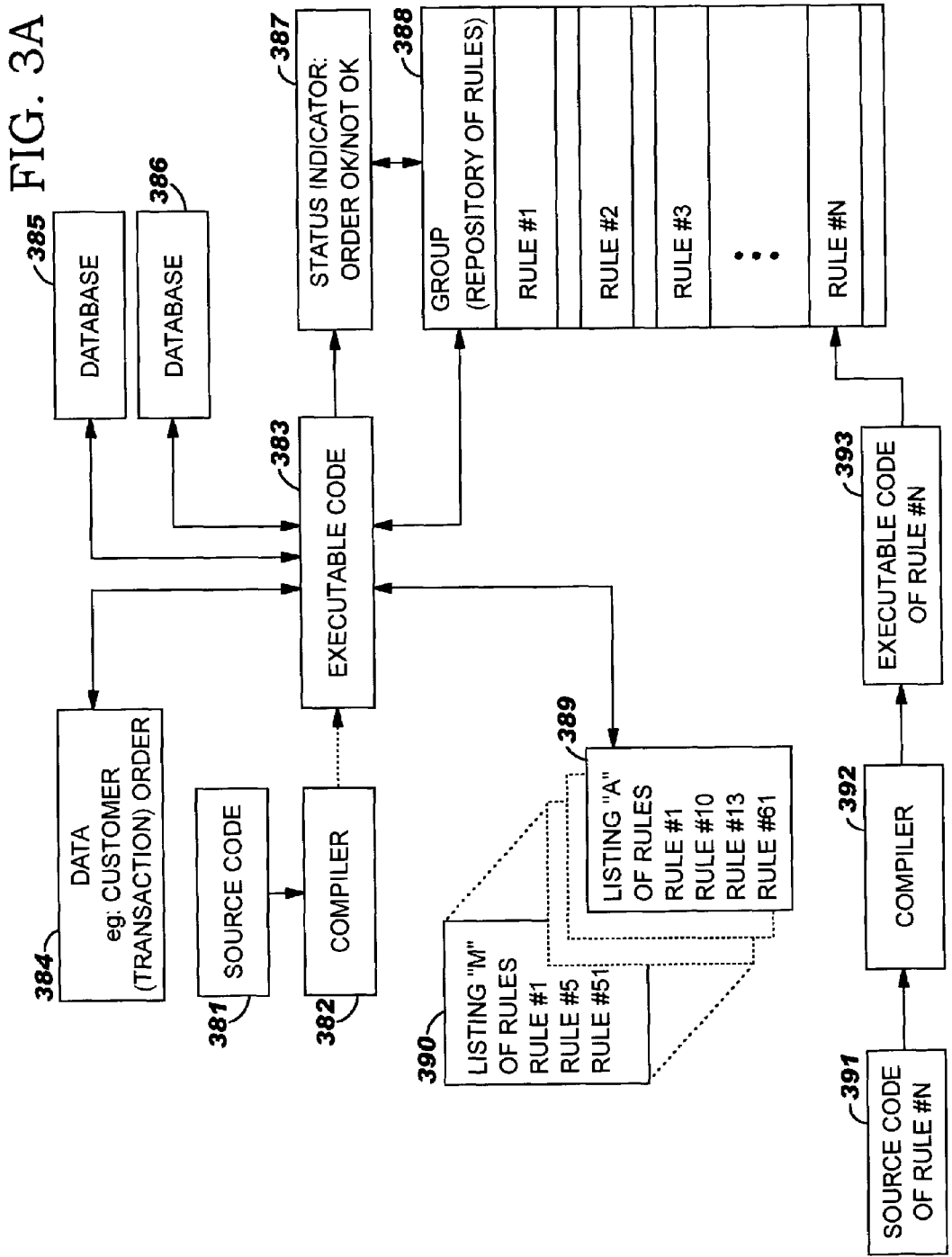

Memory 222 includes both volatile and persistent memory for storage of an embodiment 234 of the invention as depicted in FIG. 3A, and a preferred embodiment 240 of the invention as depicted in FIG. 3B. Embodiments 234 and 240 each include computer programmed instructions 236 and 242 respectively for instructing the CPU 220, and include data structures 238 and 244 respectively such as databases or lookup tables. Memory 222 also includes operating system 230, and communications suite 232. Preferably, memory 222 includes a combination of random access memory (RAM), read only memory (ROM), and a hard disk storage device. It will be appreciated that programmed instructions 236 and 242 can be delivered to memory 222 from an input/output device, such as a floppy disk 210 inserted in a floppy disk drive via input/output interface 228, or downloaded to memory 222 from network 214 via network interface 226. Operating system 230 suitably co-operates with CPU 220 to enable various operational interfacing with various subsystems of computer 204, and for providing various functionality, such as multitasking chores and the like. Communications suite 232 provides, through interaction with operating system 230 and network interface 226, suitable communications protocols to enable appropriate communications with networked computing devices via network 214, such as TCP/IP, ethernet, token ring, and the like.

Referring to FIG. 3A, there is depicted a system block diagram of an embodiment of the invention. The embodiment is depicted as embodiment 234 of FIG. 2B. The invention provides a method for testing at least one data item in a transaction order against at least one business logic rule. The invention also provides a computer program product for use in a computer system operatively coupled to a computer readable memory, the computer program product including a computer-readable data storage medium tangibly embodying computer readable program code for directing the computer to for test at least one data item in a transaction order against at least one business logic rule. The invention also provides a computer system having a computer readable memory, the system for testing at least one data item in a transaction order against at least one business logic rule.

Source code 381 contains instructions which are compiled by compiler 382 to generate executable code 383. Executable code 383 is only generated once from source code 381, and no matter how frequently the business logic rules need to be identified, changed, added, removed or the order in which the rules are executed it is not required to modify source code 381 and regenerate executable code 383. In this manner, executable code 383 remains constant, as will be explained below, unless additional functions are added or removed to suit other particular requirements of executable code 383.

The system reads data 384, which can be a customer order to transact financial instruments such as stocks, bonds and the like. It will be appreciated that data 384 can be one or more data files, and can also be a customer order to purchase pharmaceutical drugs, vehicles, real estate, customer goods, and the like. The system can also read other pertinent data which can be available from other databases 385 and 386. For the example that the data 384 is a customer order to transact financial instruments, database 385 can provide a related market quotation for the customer's transaction and database 386 can provide related customer information such as account numbers and the like.

Group 388, which can be generated and managed by executable code 383, includes a location, such as a lookup table, database, or repository, for containing individually executable rules which are identified or labelled as "Rule #1" to "Rule #N' inclusive. The group of rules 388 can also be called a repository. The repository is created for holding executable rules whereby each executable rule is adapted to encode a business logic rule. Each rule of group 388 is individually executable and includes a business logic rule. It will be appreciated that a rule of group 388 can include more than one business logic rule.

Listing of rules 389 is a convenient lookup table or database and the like having identifiers for identifying a specific subset of rules from the group 388, in which the identified subset of rules are to be executed after executable code 383 reads listing 389. Listing 389 is a listing of a subset of executable rules to be used in checking the data 384 (e.g. transaction order), wherein at least one listed executable rule is adapted to test the at least one data item against at least one business logic rule, and executable code 383 locates the listed subset of executable rules in the repository 388. Executable code 383 looks up the identified subset of rules of listing 389 and then locates the identified subset of rules from the group 388. It will be appreciated that the group of rules 388 can be merged with executable code 383 into one single unit of executable code. Preferably, group 388 is kept separate from executable code 383 for simplicity of operation. Executable code 383 requests only the identified rules (being identified from the listing 389) from group 388 and causes execution of their encoded business logic rules to check conformance of data

384. Once the executable code 383 has caused the execution of executable rules, the executing executable rules check whether the data 384 conforms to the business logic rules encoded in the executing rules. Executable code 383 causes the at least one executable rule of the subset to test the at least one data item against the at least one business logic rule.

A status indicator 387 indicates whether the data 384 conforms to the business logic rules encoded in the identified rules of listing 389. The system is adapted to indicate whether at least one data item conforms to the at least one business logic rule. The indication can be provided by executable code 383 or directly from an executable rule. Indicator 387 can be updated by the executing executable rules or by the executable code 383. Advantageously, executable code 383 is never changed. What changes is the individually executed rules and the listing that identifies the individually executed rules. When the rules need to be identified, changed, deleted or new rules need to be added to group 388, a user can manage group 388 and listing 389.

To create new rules for placement in group 388, a user writes source code 391 for a rule and then uses compiler 392 to compile code 391 to created executable code 393 which is then subsequently placed in group 388. Then the user can proceed to identify the newly created executable rule in listing 389 if desired. Listing 389 can be organized in any suitable manner such as grouping specific identified rules into subgroups for sake of simplicity. The subgroup of identified rules can be used for checking the conformance of data 384 that belongs to a category of data. Alternatively, a new listing 390 can be used for checking data that belongs to another category of data.

Referring to FIG. 3B, there is depicted a preferred embodiment of the invention. System module 300 includes rule generator 310, rule repository 320, rule selection repository 330, rule engine 340, data repository 350, and status repository 360. The arrows in FIG. 3B indicate the paths for exchanging data between the modules of system 300. System 300 is depicted as embodiment 240 of FIG. 2B.

Rule generator 310 and rule engine 340 (modules 310 and 340) include programmed instructions which can be enabled as dedicated electronic circuits or subsystems operationally coupled to CPU 220. Preferably, modules 310 and 340 are conveniently enabled as executable programmed instructions stored in memory 222 of FIG. 2, for directing the CPU 220 to achieve the desired functions and results of the preferred embodiment of invention. The programmed instructions of modules 340 and 310 are created by using compilers 302 and 305 respectively to compile source code 301 and 304 respectively to generate executable code of modules 340 and 310 respectively. Preferably, the source code 301 and 304 of modules 340 and 310 respectively are written in an object oriented computer programming language such as Java for convenience of programming. Rule repository 320, data repository 350, and status repository 360 (modules 320, 350, and 360) are enabled as data structures and they are stored in memory 222 in data structures 238 of FIG. 2. Optionally, these modules can also be enabled in dedicated electronic circuits and subsystems. The structure of these modules is described below. It will be appreciated that modules 310, 320, 330, 340, 350, and 360 can reside in a distributed computing environment, such as operationally networked computer systems, so that the modules can co-operate with each other to achieve the purposes of the invention.

Figure 4A:
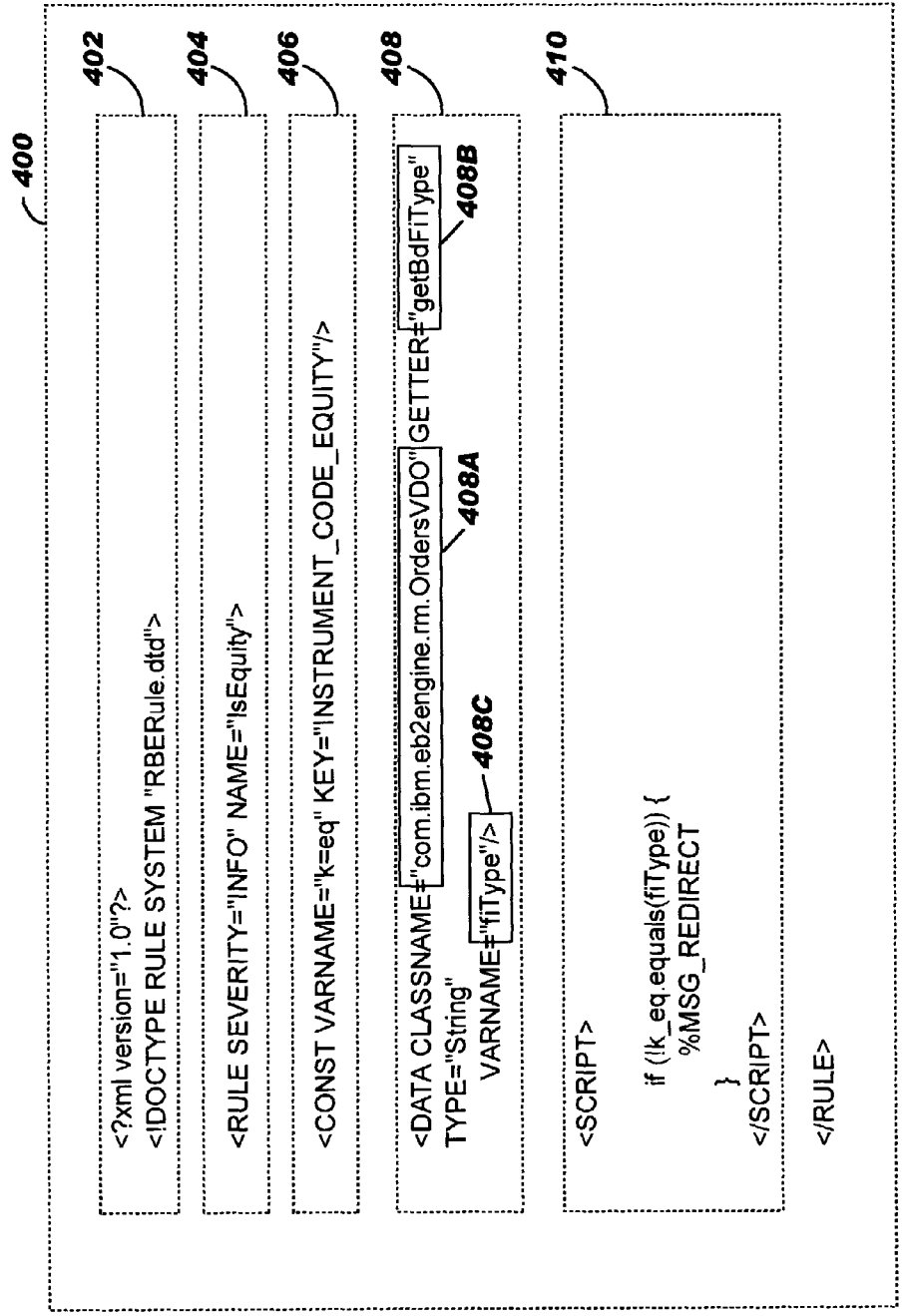
FIGS. 4A and 4B depict a script file having a business logic rule, and a method for converting the script file to a source code file.
Figure 4B:
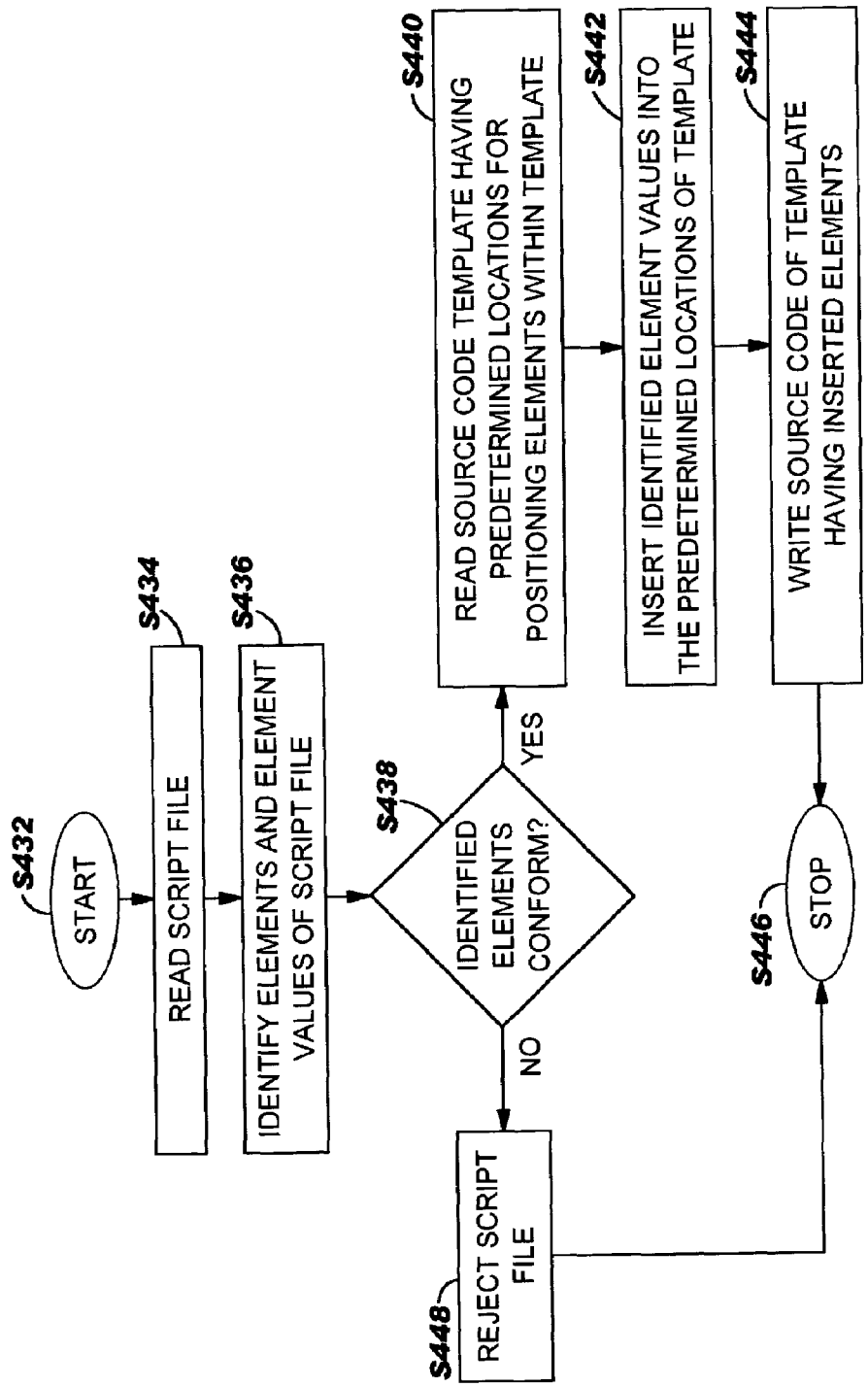

Rule generator 310 is used for creating executable rule files (ERFs) 316 for subsequent placement in the rule repository 320. Script files 312 each have business logic rules (BLRs) for checking an aspect of a customer order for transacting a financial instrument in conjunction with market quotation for the financial instrument. Preferably, and for the sake of convenience, a script file is a structured document, such as a text file, or more conveniently, it is an XML formatted file that is written in a suitable markup language having data tags, such as Extensible Mark-up Language (XML). Essentially, a user uses the script file 312 to write or script business logic rules into the script file 312. FIG. 4A depicts an example of a script file 312. For simplicity of programming, each BLR is defined in an individual script file 312. Optionally, a script file 312 can include two or more BLRs. FIG. 4B depicts a method for converting script file 312 into source code file 314. The executable rules generated by rule generator 310 are subsequently placed in rule repository 320.

To create source code files, the rule generator 310 can read and convert the script file 312 into a suitable corresponding source code file 314 having suitable high level source code written in a computer programming language. Preferably, each script file 312 is converted into a corresponding source code file 314, and the high level source code is written in an object oriented programming language, such as Java. FIGS. 5a and 5b provide an example of a script code file and a source code file of an executable rule.

Figure 7:
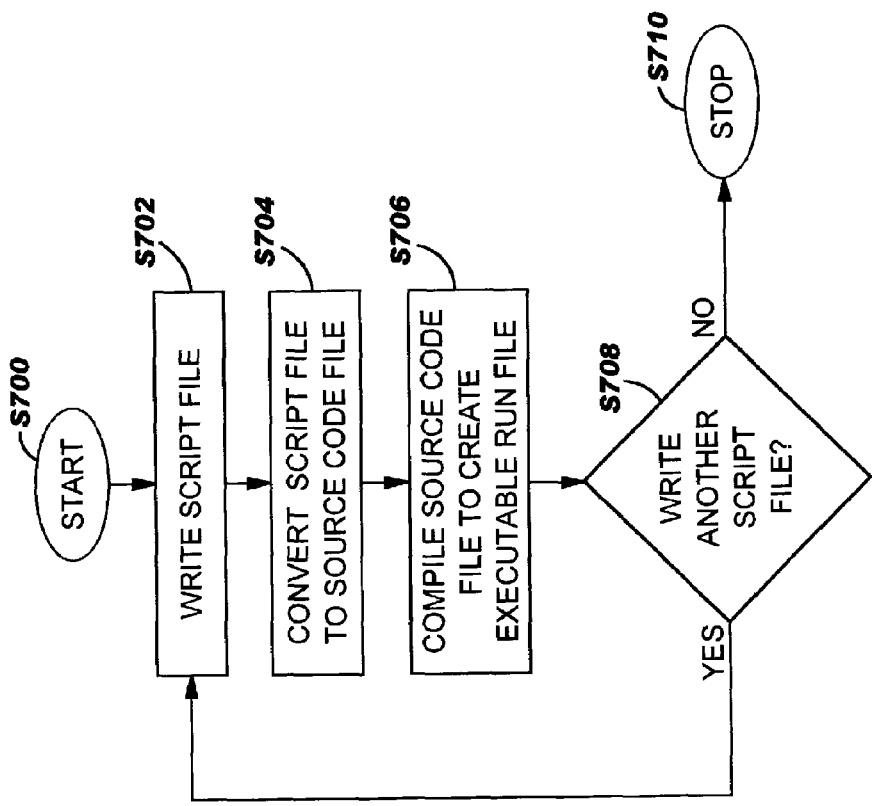
FIG. 7 depicts a flowchart of an operation of a rule engine.

A suitable and compatible compiler can be used to compile the source code file 314 into a corresponding executable rule file 316 that can direct CPU 220 to perform business logic rule on a customer order. Preferably, the compiler can compile Java programmed source code into executable programmed code. An advantage provided by the invention is that the user who writes the script files 312 does not need to be familiar with computer programming languages. It is expected that the user is familiar with business logic that is needed to check customer orders for transacting financial instruments. The user is required to insert suitable business logic rules in the script file for subsequent conversion, by the rule generator 310, into appropriate source code files 314, and then subsequent conversion or compilation into an executable rule file (ERF) 316. FIG. 7 provides an example of a flow chart that illustrates the operation of the rule generator 310.

The rule repository 320 can be any convenient database and provides a data structure for suitably holding or containing a plurality of N available executable rule files (AERFs) 323A-323N each being identifiable by a unique identification, such as a filename. Preferably, the executable rule files 323A-323N stored in rule repository 320 are independently executable files. Executable rules 323A-323N are shown to illustrate that each executable rule is separate and individually executable. The rule engine 340 will retrieve a plurality of suitable executable rule files, from the rule repository 320, for subsequent testing of a customer order, in a manner to be detailed later. It will be appreciated that the rule repository 320 can be split into convenient subgroups and subsequently distributed over a plurality of networked computers. However, for a convenient explanation, the rule repository 320 is maintained as a whole in the memory of a single computer system. The rule engine 340 uses the rule repository 320 to obtain a suitable executable rule having the encoded business logic rule. The rule repository 320 is a convenient container for placing all of the available executable rules.

Figure 6B:
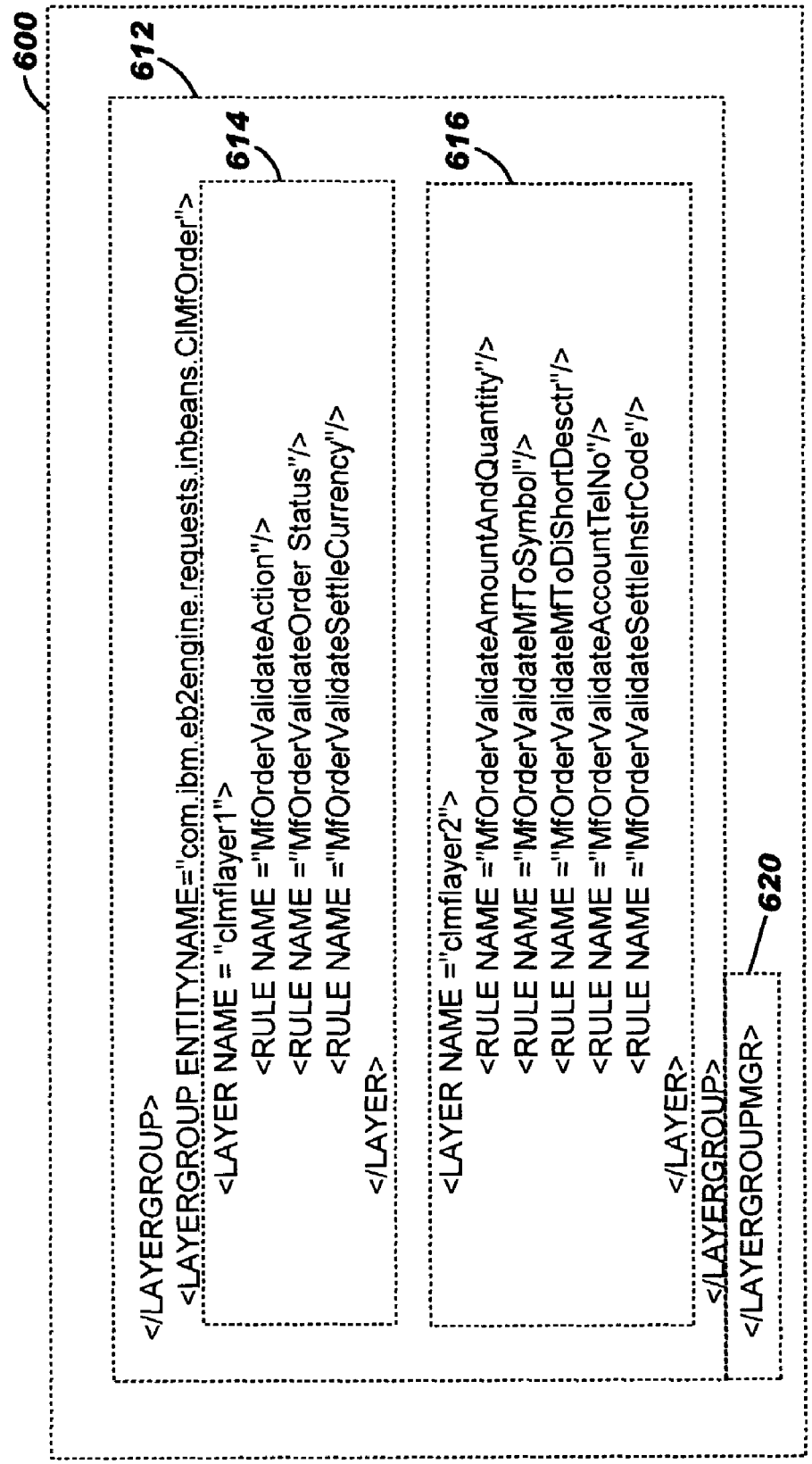

Rule selection repository 330 is a listing of selected AERFs from rule repository 320, and provides a convenient data structure for M user-identified groups of selected available executable rule files 332A-323M. Preferably, the rule selection repository 330 is a text file, and more preferably, the text file is formatted in Extensible Markup Language (XML) using data tags. Preferably, a user constructs a pair of group name data tags, each pair of group name tags for identifying a group of selected executable rule files, for example the group of selected AERFs 332A. Preferably, nested or inserted within each pair of group name data tags are pairs of rule identification data tags, in which each pair of rule identification tags is used for identifying or selecting a name of a preferred executable rule file. Each selected available executable rule file that is identified between each rule identification data tag is available from the rule repository 320. FIGS. 6A and 6B provide an example of a preferred embodiment of a rule selection repository enabled as a text file incorporating XML formatting and data tags. In summary, rule engine 340 examines the rule selection repository 330 to locate one or more identified or preferred executable rules, and the rule engine must subsequently locate the preferred executable rules from the rule repository 320. Once the preferred executable rules are located in rule repository 320, the rule engine executes the located preferred executable rules to check the conformance of the customer order. When the rules need to be changed, the rule selection repository, which can be a simple lookup table, can be modified to suit the current requirements. Advantageously, the executable code having the programmed instructions of rule engine 340 does not need to be regenerated. To adapt to the new requirements for checking the conformance of the customer order, either new executable rules are generated via rule generator 310 or the rule selection repository 320 is modified, or both actions can be taken as required, but the executable code of rule engine 340 is not regenerated.

To check whether a customer order conforms to the business logic rules, rule engine 340 reads, from the rule selection repository 330, identification, such as a file name, of executable rule files from between each pair of rule identification data tags, and subsequently, the rule engine requests execution of identified executable rule files. When the number of executable rule files contained in the rule repository 320 is very large, it would be preferable that each group 332A-332M be assigned to a corresponding category of customer orders. It may be desirable to organize customer orders into suitably convenient categories to reduce the quantity of rules that need to be executed. Also, it would be advantageous to execute certain rules that do apply to specific categories of customers orders.

It will be appreciated that a suitably structured file can be used as a rule selection repository 330, in which the structure of the file would allow for convenient identification of the groups or subgroups of selected executable rule files, and allows a user to conveniently add, remove, or reorder the selected executable rule files. This feature advantageously allows a user to compile executable rule files when needed, and avoid recompiling an executable file for the rule engine 340. If a recently compiled executable rule file fails to execute properly, a user can focus their debugging effort on the script file 312, and avoid having to deal with the executable file for the rule engine 340.

Each group of selected AERFs 332A-332M corresponds to a specific category of customer orders, such as a first customer order category for transacting sale of a stock, a second customer order category for transacting purchases of stocks, and so on for bonds, mutual funds, options and the like. The organization of executable rule files into categories is used for simplicity and convenience of organization, where 332A-332M have identifications of executable rule files. The group is used for checking conformance of a specific category of customer orders. Optionally, a single group of executable rule files can be used for testing all types of customer orders but at a potential disadvantage of added complexity for the user.

Preferably, the rule selection repository 330 is a structured file or a document that is written in a suitable markup up language having data tags, such as the Extensible Mark-up Language (XML). The rule selection repository 330 is described in more detail with reference to FIGS. 6a and 6b.

Data repository 350 provides a convenient data structure for storing or containing input data, such as a plurality of J customer orders 352A-352J. Rule engine 340 reads a customer order from repository 350. It will be appreciated that the input data will be compared with suitably matching business logic rules, and the scope of this invention is not limited to merely checking customer orders for financial transactions. For ease of programming, it is preferred to categorize the customer orders into convenient categories, as explained earlier. A market quotation 354A-354J is associated with a corresponding customer order 352A-352J. As quotation provides a market condition of the customer order for a financial transaction, such as the price of a stock or a bond. A market quotation can reveal the market conditions at the time the associated customer order was placed.

Status repository 360 provides a convenient mechanism for indicating whether a customer order 352A-352J conforms to business logic rules as implemented and executed in executable rule files 316. Rule engine 340 places the indicator in repository 360. After execution of an AERF, the executed AERF provides an execution result, in which the rule engine can store the execution result in status repository 360 or the executed rule file can store its own execution result in the status repository 360. The status indicators 361 indicate whether the customer orders conform to the business logic rules encoded in the executed rule files 316. Preferably, the status indicators 361 contain the status execution of the executed rule files associated with a group of selected AERFs 332A-332M.

Rule engine 340 can transmit a message to a requesting application, which had previously requested the rule engine 340 to check conformance of the customer order. The message can show that one of the status indicators 361 is available for review by the requesting application so that the requesting application can decide whether to forward the analysed customer order to a order fulfillment system or forward the customer order and the status indicator back for modification and subsequent re-testing by rule engine 340. The rule engine 340 can be adapted to perform an analysis of the status indicators 361, and the rule engine 340 can decide whether to send a customer order to the legacy system, such as an order fulfillment system, or send the customer order back for modification.

It will be appreciated that if nonconforming customer orders were to be submitted to the legacy system, there would be a possibility that the legacy system would reject nonconforming customer orders. When customer orders do not conform to the executed business logic rules, the status indicators 361 can be queried by the user to provide the reasons why the customer order does not conform so that appropriate corrective action can be taken to appropriately modify the nonconforming customer order.

Rule engine 340 is used for checking whether customer orders 352A-352J conform to business logic rules (BLRs). The rule engine 340 can be adapted to analyse various types of data. In the preferred embodiment, the data is a customer order for transacting a financial instrument, such as:

| | |
|---|---|
| Order type: | buy |
| Quantity of shares: | 1,000 |
| Stock symbol: | IBM |
| Price per share: | $150 |
| Broker ID: | 987 |
| Account No. | ABC1234 |
| Account Type: | tax sheltered |
| Customer Name: | John Smith |

In the preferred embodiment, the Customer Name is not contained in the order because the Account ID would be sufficient. A joint account can have two or more customer names.

The data that is provided in the above example includes a set of data elements, such as 'order type', 'quantity of shares', 'Stock symbol', etc., and each data element has a corresponding data value, such as 'buy', '1,000', 'IBM', etc.

A user can submit a customer order to a financial broker and request fulfillment of the submitted order. To fulfill the submitted order, the broker can obtain related business factor data. For example, the related business factor data can be a quotation for the financial instrument, such as:

| | |
|---|---|
| Stock symbol: | IBM |
| Bid price: | $140 |
| Ask price: | $170 |
| Closing price: | $140 |
| Volume of shares: | 1,500,000 |

Figure 8:
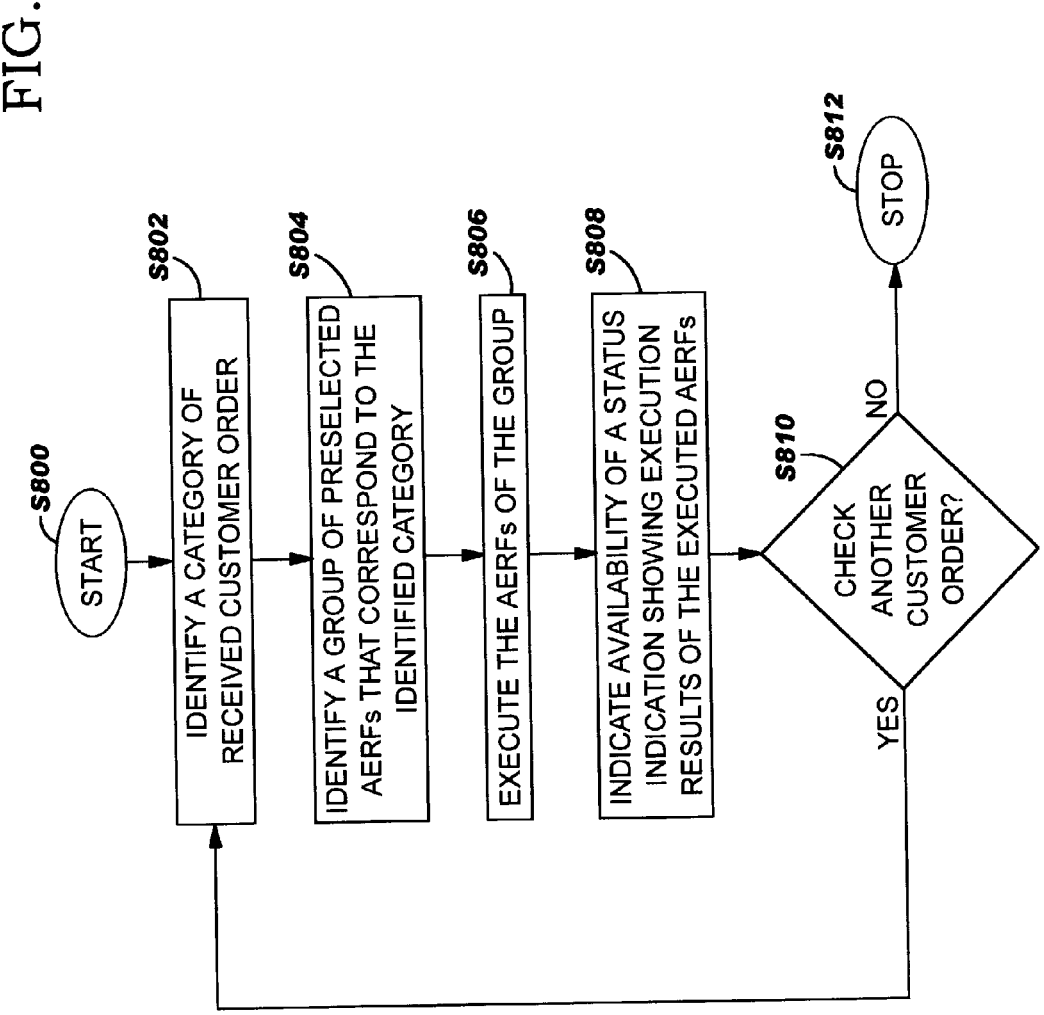
FIG. 8 depicts a flowchart of an operation of a rule generator.

Rule engine 340 includes various sub-modules to achieve various desirable functions, such as a reader 341, a determinator 342, a locator 344, a requester 345, a receiver 346, an execution analyser 347, a transmitter 348, and a dynamic rule selector 349. It will be appreciated that the sub modules 341 to 349 of rule engine 340 can be distributed in a convenient manner throughout a distributed computer networking environment. However, for the convenience of describing the preferred embodiment of the invention, the sub modules 341 to 349 of rule engine 340 reside in computer 204 (FIG. 2A), and more preferably in memory 222 of computer 204, in which the sub modules are conveniently enabled as various source code files having logic, in which the source code files are subsequently compiled into executable files that achieve the functions of the sub modules, as known to skilled persons in the art of computer programming languages and computer systems in general. FIG. 8 provides an example of a flow chart for illustrating the general operation of the rule engine 340.

The rule engine 340 includes a reader 341 used for reading a customer order 352A-352J. Determinator 343 is used for determining a category of the read customer order. Locator 344 is used for locating, from the rule selection repository 330, a group of user-selected executable rule files 332A-332M that corresponds to the determined category of the read customer order.

Requestor 345 is used for locating, from the rule repository 320, and initiating execution of available executable rule files 316 that are identified in a group of the user-selected executable rule files 332A-332M from rule selection repository 330. Subsequent execution of each identified AERF obtains data from the customer order that is preferably located in the data repository 350.

Figure 9:
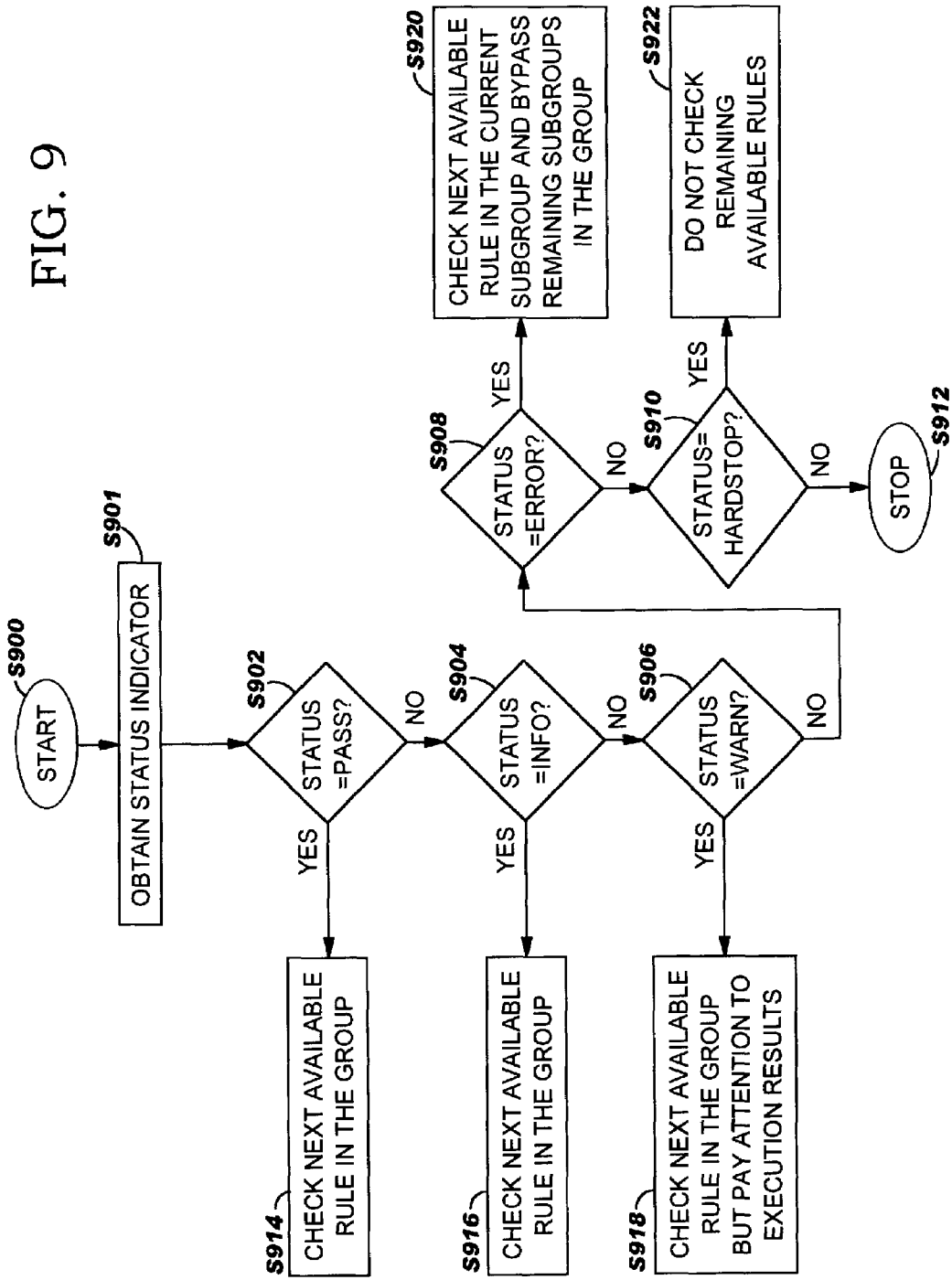
FIG. 9 depicts a flowchart of an operation of an execution analyser.

Receiver 346 is used for receiving or obtaining an execution result that is contained in the status indicators 361. Preferably, the rule engine 340 includes execution analyser 347 responsive to the execution result for each executed executable rule file. The execution analyser 347 can include logic to determine whether the rule engine should execute the remaining unexecuted executable rule files of a group 332A-332M, depending on the execution result of the previously executed executable rule file. For example, if an execution result indicates the executed business logic of the first executable rule of group 332A was satisfied, then the execution analyser 347 can direct the rule engine 340 to execute the next executable rule file identified in group 332A. Alternatively, if the execution result indicates the executed business logic was not satisfied, the execution analyser 347 can direct the rule engine 340 to stop further executions of unexecuted executable rule files and indicate that one of the status indicators 361 is available for analysis so that the customer order can be adjusted and resubmitted for additional testing by the rule engine 340. The operation of the rule execution analyser is depicted in the flowchart of FIG. 9.

The execution analyser 347 provides enhanced and beneficial functionality to the rule engine 340. However, it will be appreciated that the execution analyser 347 can be disabled to remove these preferred enhancements to realize a simpler operation of the rule engine 340.

Preferably, transmitter 348 is used for transmitting availability of the status indicators 361, located in status repository 360, to a requesting application that submitted a request to check the conformance of a customer order against business logic rules. Optionally, the rule engine 340 can be adapted to transmit status indicators 361 to the requesting application.

Preferably, rule engine 340 includes a dynamic rule selector 349 used for sequencing a preferred sub-selection of executable rule files of a group 332A-332M. In the preferred embodiment, the dynamic rule selector 349 is used for checking requests to change or modify operational or system parameters of system 300 of FIG. 3. However, it will be appreciated that the dynamic rule selector 349 can be used for examining customer orders. The operation of the dynamic rule selector 349 is illustrated in the flowchart of FIG. 11. Preferably, the dynamic rule selector 349 engages when rule selection repository is suitably adapted with keyed information, as will be explained below.

Referring to FIG. 4A, there is depicted an embodiment of a script file 312 of FIG. 3B. The script file is implemented in a text file incorporating XML formatting with data tags. Preferably, the business logic rules are inserted between a pair of data tags in an XML document. An XML file is merely a text file that contains strings of text in which each string of text is encapsulated within a pair of data tags. Names of the data tags provide the meaning of the encapsulated text. It will be appreciated that other file structures can be adapted for usage with the invention, provided that the structure of the file gives meaning to the string of text. Exemplary script file 400 includes a header 402, a rule severity indicator or a rule status indicator 404, a first scripted text string 406 representing a factor used for validating the subject (i.e., the data that the rule engine 340 will be checking or validating against the validation logic), a second scripted text string 408 representing the source and the description of the subject, and a third scripted text string 410 representing the validation logic. The header 402 includes a first line that is a standard XML file header, which is not specific to the rule engine 340, and a second line that includes rule syntax validation. The rule severity indicator or a rule status indicator 404 is used by the rule engine 340 to determine an appropriate execution path within the set of rules depending on the validation results of a currently checked portion of the subject. The first scripted text string 406 is used for retrieving predefined values to be used by the third scripted text 410 for validation. The second scripted text string 408 is used for retrieving data supplied by the client to be used by the third scripted text 410 for validation. The third scripted text string 410 describes the actual validation logic that will be used to validate a portion of the subject.

Referring to FIG. 4B, there is depicted a preferred method for converting a script file such as script file 400 into source code file 314 of FIG. 3B. The process of conversion begins in step S432. In step S434, the script file 400 is read. In step S436, elements of the script file are identified. FIG. 4A depicts various values of elements of script file 400 as blocks 408A, 408B and 408C. The script file 400 is an XML document. However, any document having a predetermined structure will suffice. XML technology was chosen because the data tags help impose structure into the document. Element value 408A is "com.ibm.eb2engine.rm.OrdersVDO" for element "<DATA CLASSNAM="...."/>. In step S438, a determination is made whether each identified element conforms to a list of predetermined element identifiers. Since the preferred embodiment is using XML documents, DTD (Document Type Definition) is used to check whether the elements of script file 400 conform to the predetermined types of elements that will be acceptable. If a user attempts to use an element name that is not defined in the DTD, then an error message is created and the script file is rejected in step S448. The process then ends with step S446.

It will be appreciated that an XML parser can be used for identifying elements of the script file which is an XML document. The DTD defines the elements that are allowable, the sequence of the elements, the number of allowable occurrences of the element, and what element values can be allowed for an element. The DTD is used to check whether the writer of the script file 312 followed or used the acceptable element names and element values.

Otherwise, (i.e., the elements conform), in step S440 a source code template is read. The source code template has predetermined locations in which the element values will be placed in a later step. In step S442, the identified element values of the script file are inserted into corresponding predetermined locations in the template. For example, element value 408A will be inserted into block 524 of FIG. 5A. Element value 408B will be inserted into block 526. Element value 408C will be inserted into block 528. In step S444, the process writes the source code file which is the template having the inserted element values.

Referring to FIGS. 5A and 5B, there is depicted an example of various portions of a source code file 314. Preferably, the rule generator 310 converts the script file 312 into the source code file 314 that is written in an object oriented computer programming language, such as Java. Source code portion 502 corresponds to section 406 of FIG. 4A. Source code portion 500 corresponds to section 408 of FIG. 4A. Source code portion 504 corresponds to section 410 of FIG. 4A. The rule generator 310 includes a converter module for achieving the functional task of converting the script file 312 into the source code file 314. FIG. 4B depicts a method for converting script files into source code files.

Referring to FIGS. 6A and 6B, a preferred embodiment of the rule selection repository 330 is illustrated. In this embodiment, the rule selection repository 600 is a text file incorporating XML formatting and data tags. The rule selection repository 600 is illustrated as extending between FIGS. 6a and 6b. The rule selection repository 600 includes a header section 602, a first group 604 having subgroups 606, 608, 610, and a second group 612 having subgroups 614 and 616, and an footer 620.

Identification, preferably a file name, of an executable rule file of the executable rule files 316 of FIG. 3B is indicated in rule selection repository 600 by using a a pair of rule identification data tags:

<RULE NAME="name of executable rule file"/>.

Figure 10:
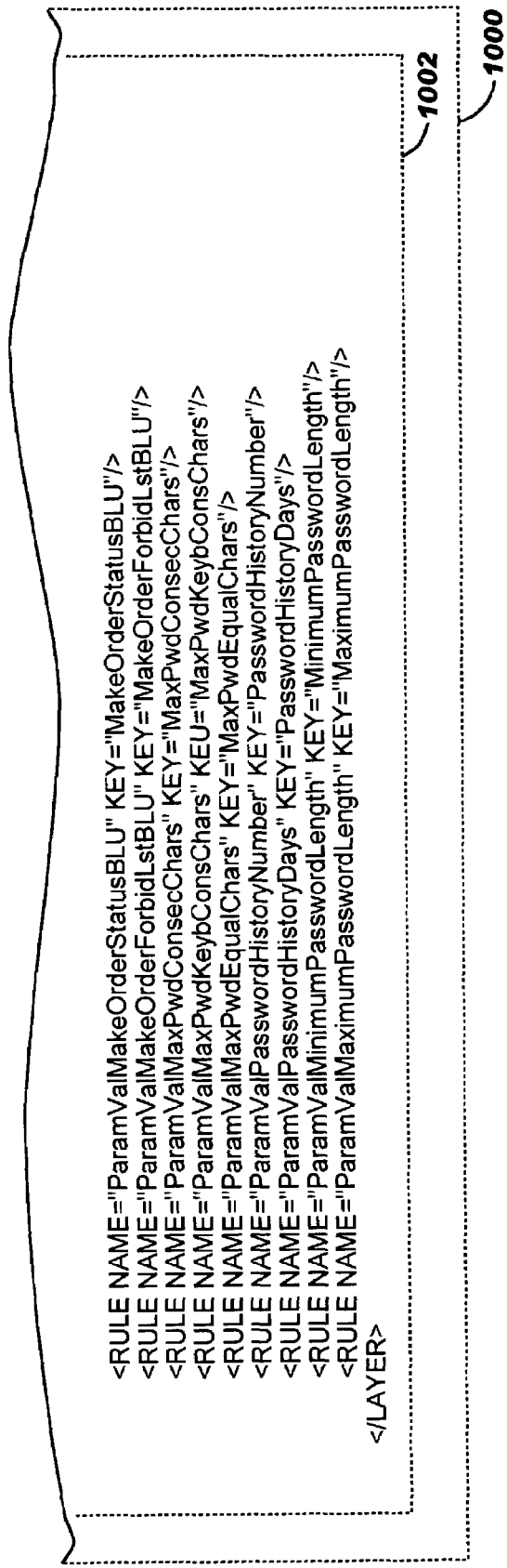
FIG. 10 depicts a rule selection repository enabled for dynamic rule selection.

The identification of a plurality of executable rule files 316 can be sequenced in a preferred order to take advantage of the functions provided by an execution analyser 347 or a dynamic rule selector 349, as will be detailed later in this description. Briefly, the execution analyser 347 will read an execution status of an executed executable rule file and subsequently determine whether to request execution of the remaining unexecuted executable rule files being identified in the appropriate group of selected AREFs 332A-332M. Briefly, the dynamic rule selector 349 will read and 'dynamically' determine which data elements present within an invalidated subject actually match up with names of the executable rule file from the appropriate group 332A-332M, and subsequently execute only the matching executable rule files and bypass the remaining unmatched executable rule files. Currently, the dynamic rule selector 349 has been implemented for a system configuration/parameter list (an example is depicted in FIG. 10). The parameter list can include system parameters such as user passwords, number of lines to display on a computer monitor and the like. If required, it will be appreciated that selector 349 can be implemented for validating customer orders.

The identification of one of the groups of selected AREFs 332A-332M of rule repository 320 is indicated in repository 600 within the following group name data tags:

<LAYERGROUP ENTITYNAME="layer group name">

Identified group 604 is named "ClOptionOrder". Group 604 is used for checking a customer order for transacting an option. Group 604 identifies subgroup 606 named "cloplayer1", subgroup 608 named "cloplayer2", and subgroup 610 named "clopcxr". Identified group 612 identifies subgroup 614 named "clmflayer1", subgroup 616 named "clmflayer2". Identification of subgroups 606, 608, 610, 614, 618 is indicated in repository 600 as the following pair of subgroup identification data tags:

<LAYER NAME="subgroup name">

Each subgroup 606, 608, 610, 614, 618 is used to identify a set of file names of executable rule files located in rule repository 320. When a customer order for transacting an option is received by system 300, the rule engine 340 identifies that a category of the customer order is 'option' and locates group 604 corresponding to the category 'option'. Layers, such as "cloplayer1", represent a logical grouping of several rules, which do not correspond to a data element of a subject undergoing validation, such as a customer order. The motivation to create the layers, such as "cloplayer1" is for convenience in that some rules logically belong to a group of their own in that they only make sense when executed together as a group of rules.

Referring to FIG. 7, there is depicted a preferred method for operating the rule generator 310 of FIG. 3B. At step S700, a user begins the process for creating executable rule files. In step S702, the user writes business rule logic into the script file 312. Preferably, the script file 312 is formatted using the XML standard which adheres to a suitable style sheet. It will be appreciated that the script file 312 represent a convenient mechanism to identify the written business logic rules scripted by the user. In step S704, the rule generator 310 reads and converts the script file 312 into a suitable source code file 314. FIG. 4B depicts a method for converting script files into source code files.

In step S706, the rule generator 310 compiles the source code file into a corresponding executable rule file 316. In step S708, the user can decide to script another script file 312, or decide to stop scripting script files 312 altogether.

Referring to FIG. 8, there is depicted a preferred operation of rule engine 340 of FIG. 3B. In step S800, the rule engine 340 is initialized and the process starts. In step S802, a request to check a customer order was received by the rule engine 340, perhaps from another computer application or from a keyboard signal. The rule engine 340 identifies a category of the customer order that needs to be checked for conformance to business logic rules. In step S804, the rule engine 340 identifies one of the groups of selected AREFs 332A-323N, the group corresponding to the identified category of the customer order. In step S806, the rule engine 340 requests or begins a process for executing the executable rule files that are identified in the identified group. In step S808, after the identified executable rule files have completed their execution, the rule engine 340 receives a notification that the identified executable rule files have completed their execution. Preferably, the executed rule files place their execution results in the status repository 360, preferably into a corresponding status indicator of the status indicators 361.

Optionally, rule engine 340 could transmit the status indicator to the requesting application that the execution results are available for review by the requesting application. In turn, the requesting application can review the execution results and, depending on the types of execution results contained in the status indicator, determine whether to forward the analysed customer order back for modification, or whether to forward the analysed customer order to an existing legacy system for transaction execution of the analysed customer order. Optionally, the rule engine 340 can be adapted to decide whether to forward the customer order for transaction execution, by including an appropriate module to handle this extra functionality.

Referring to FIG. 9, there is depicted a preferred operation of the execution analyser 347 of the rule engine 340 of FIG. 3B. In steps S900 and S901, the execution analyser 347 obtains and reads the status indicator of an executed executable rule file from the status indicator 361. In step S902, the execution analyser 347 reads an execution result of 'PASS' from the status indicator. 'PASS' indicates that a data element of the customer order satisfactorily conforms to the executed executable rule file, and that the next available executable rule file of the current group of selected AREFs can be executed (or the next group can be executed), as indicated in step S914. If the execution result is not 'PASS', then the operation continues to step S904.

In step S904, the execution analyser 347 reads an execution result of 'INFO' from the status indicator. 'INFO' indicates that the data element of the customer order conforms to the executed executable rule file, and that the next available executable rule of the current group of selected AREFs can be executed (or the next group can be executed), as indicated in step S916; however, the data element conforms reasonably but there might be something about the customer order that the user may wish to review. If the execution result is not 'INFO', then the operation continues to step S906.

In step S906, the execution analyser 347 reads an execution result of 'WARN' from the status indicator. 'WARN' indicates that the next executable rule can be executed, but attention should be placed to the execution results stored in the status indicator 361, as shown in step S918. If the execution result is not 'WARN', then the operation of the execution analyser 347 continues to step S908.

In step S908, the execution analyser 347 reads an execution result of 'ERROR' from the status indicator. "ERROR" indicates that the unexecuted rules of the current subgroup of the current group of selected AREFs can be executed, but remaining unexecuted executable rule files that are identified in remaining subgroups are not to be executed, as shown in step S920. The execution result indicates something is wrong with the customer order, but the remaining executable rule files of the current subgroup can be executed, as shown in step S920. If the execution result is not 'ERROR', then the operation of the execution analyser 347 continues to step S910.

In step S910, the execution analyser 347 reads an execution result of 'HARDSTOP'. 'HARDSTOP' indicates that any remaining unexecuted executable rule files are not to be executed because the execution result indicates something seriously incorrect with the customer order, as shown in step S922. Processing then continues to step S912 where the process stops and control is passed back to the rule engine 340.

Referring to FIG. 10, illustrated is a preferred embodiment of a rule selection repository 330 enabled for dynamic selection of executable rule files of the groups of selected AREFs 332A-332M. The preferred rule selection repository 1000 includes a group 1002 enabled for dynamic selection of executable rules 316. The name of group 1002 is 'ParameterLst'. It is a group 1002 of identified or selected executable rules organized into various subgroups, for example, subgroups 1004 and 1006. Group 1002 is used for changing the system parameters of system 300 of FIG. 3B. Subgroup 1004 is used for changing system parameters dedicated to monitoring various market conditions. Subgroup 1006 is used for changing system parameters for a historical review of transacted customer orders. An identified rule name 1008, located in subgroup 1004, is a particular executable rule file for validating the support phone number of the broker. Ideally, when one or only a few system parameters need to be changed, it would be preferable to execute the rules that match the particular system parameter that needs to be changed.

Referring to FIG. 11, there is depicted a preferred operation of dynamic rule selector 349 of the rule engine 340 of FIG. 3B. In steps S1100 and S1102, the process begins and rule engine 340 determines a category of the input data, the input data can be either a customer order or a request to change the system parameters of system 300 of FIG. 3B. In step S1104, the rule engine 340 determines that the identified category listed in the rule selection repository is enabled for dynamic rule selection by a dynamic rule selector 349, in which case operation continues to step S1108; otherwise, processing continues to step S1106 in which case the rule engine operates as previously described.

In step S1108, the dynamic rule selector 349 selects identified executable rules, such as identified executable rule file 1008 of FIG. 10, that are listed in the group being enabled for dynamic rule selection, such as group 1002 of FIG. 10, in which the selected identified executable rules match up with the data elements that are present within the request to change the system parameters.

In step S1110, the dynamic rule selector 349 provides a list of matching executable rule files for the rule engine 340 to execute. In step S1112, the dynamic rule selector 349 passes system control back to the rule engine 340.

The system provides a modularized approach which does not require an experienced programmer to update the listing of executable rule files in response to requirements for periodically incorporating new business logic, or reordering the rules. Advantageously, a non-programmer can operate and adapt the invention to execute preferred executable rule files as required.

Advantageously, the present invention reduces associated transaction expenses and improves customer service. Additionally, the invention also reduces complexity of usability for modifying or changing sequences of desired rule execution. The invention provides a mechanism for determining whether a submitted customer order complies with 'know your client' guidelines, for determining whether customers are covered for their buy/sell order, and for determining whether the composition of the customer order conforms to business logic rules.

It will be appreciated that variation of some elements are possible to adapt the invention for specific conditions or functions. The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:
1. A method for processing a customer order pertaining to a transaction, said method comprising:
   identifying a category of the customer order;
   identifying a group of executable rule files corresponding to the identified category, each executable rule file comprising at least one business logic rule, said group of executable rule files stored in a repository, said group of executable rule files consisting of a first subgroup of executable rule files and at least one remaining subgroup of executable rule files, said first subgroup of executable rule files consisting of a first executable rule file and at least one remaining executable rule file, each subgroup of the at least one remaining subgroup of executable rule files comprising one or more executable rule files;
   selecting the first subgroup followed by selecting the first executable rule file in the first subgroup;
   after said selecting the first executable rule file in the first subgroup, executing the first executable rule file in the first subgroup with respect to the customer order prior to execution of any other executable rule file in the group of executable rule files, wherein executing any executable rule file of the group of executable rule files with respect to the customer order comprises applying the at least one business logic rule of said any executable rule file to the customer order; receiving an execution result of the executed first executable rule file;
   first determining whether the execution result is PASS;
   if said first determining determines that the execution result is PASS, then executing a next executable rule file of the at least one remaining executable rule file in the first subgroup with respect to the customer order;
   if said first determining determines that the execution result is not PASS, then second determining whether the execution result is INFO;
   if said second determining is performed and determines that the execution result is INFO, then selecting a next executable rule file of the at least one remaining executable rule file in the first subgroup and executing the selected next executable rule file with respect to the customer order, wherein the execution result of INFO denotes a need for reviewing an aspect of the customer order;
   if said second determining is performed and determines that the execution result is not INFO, then third determining whether the execution result is WARN;
   if said third determining is performed and determines that the execution result is WARN, then picking the next executable rule file of the at least one remaining executable rule file in the first subgroup and executing the picked next executable rule file with respect to the customer order, wherein the execution result of WARN denotes a need for reviewing results from the executed first executable rule file;
   if said third determining is performed and determines that the execution result is not WARN, then fourth determining whether the execution result is ERROR;
   if said fourth determining is performed and determines that the execution result is ERROR, then choosing a next executable rule file of the at least one remaining executable rule file in the first subgroup, executing the chosen next executable rule file with respect to the customer order, identifying each subgroup of the at least one remaining subgroup of executable rule files, and inhibiting execution of each executable rule file in each identified subgroup of the at least one remaining subgroup of executable rule files;
   if said fourth determining is performed and determines that the execution result is not ERROR, then fifth determining whether the execution result is HARDSTOP;
   if said fifth determining is performed and determines that the execution result is HARDSTOP, then inhibiting execution of all executable rule files of the at least one remaining executable rule file in the first subgroup with respect to the customer order and further inhibiting execution of the one or more executable rule files in each subgroup of the at least one remaining subgroup of executable rule files with respect to the customer order;
   if said fifth determining is performed and determines that the execution result is not HARDSTOP, then stopping performance of said method;
   wherein said first determining determines that the execution result is not PASS, wherein said second determining determines that the execution result is not INFO, wherein said third determining determines that the execution result is not WARN, and wherein said fourth determining determines that the execution result is ERROR;
   wherein said selecting the first subgroup comprises selecting a subgroup used for changing a plurality of system parameters dedicated to monitoring market conditions relevant to the transaction, wherein said executing the chosen next executable rule file comprises changing a first system parameter of the plurality of system parameters in the selected subgroup used for changing the plurality of system parameters dedicated to monitoring market conditions relevant to the transaction, wherein said identifying each subgroup of the at least one remaining subgroup of executable rule files comprises identifying a subgroup used for changing the plurality of system parameters for a historical review of transacted customer orders, and wherein said inhibiting execution of each executable rule file in each identified subgroup of the at least one remaining subgroup of executable rule files comprises inhibiting execution of each executable rule file in the identified subgroup used for changing the plurality of system parameters for the historical review of transacted customer order.

* * * * *